US008161905B2

(12) United States Patent
Vianello et al.

(10) Patent No.: US 8,161,905 B2
(45) Date of Patent: Apr. 24, 2012

(54) AUTOMATIC MACHINE FOR VERSATILE AND ALTERNATIVE APPLICATION OF AT LEAST TWO TYPES OF SEALANT ALONG THE PERIMETRIC RIM OF AN INSULATING GLAZING UNIT

(75) Inventors: Fortunato Vianello, Vallio Di Roncade (IT); Dino Moschini, Roncade (IT)

(73) Assignee: For.El.Base Di Vianello Fortunato & C. S.N.C., Vallio Di Roncade (IT)

( * ) Notice: Subject to any disclaimer, the term of this patent is extended or adjusted under 35 U.S.C. 154(b) by 1056 days.

(21) Appl. No.: 11/907,974

(22) Filed: Oct. 19, 2007

(65) Prior Publication Data

US 2008/0092482 A1 Apr. 24, 2008

(30) Foreign Application Priority Data

Oct. 20, 2006 (IT) .............................. TV2006A0187

(51) Int. Cl.

| | |
|---|---|
| ***B05C 11/00*** | (2006.01) |
| ***B05C 3/02*** | (2006.01) |
| ***B05C 5/00*** | (2006.01) |
| ***B05B 3/00*** | (2006.01) |
| ***B32B 41/00*** | (2006.01) |

(52) U.S. Cl. ........ 118/684; 118/410; 118/411; 118/429; 118/323; 156/356; 156/357; 156/575; 156/578

(58) Field of Classification Search .................. 118/408, 118/410, 668, 684, 323, 429, 411; 156/64, 156/99, 105, 107, 109, 244.22, 365, 357, 575, 578; 52/786.1, 741.4

See application file for complete search history.

(56) References Cited

U.S. PATENT DOCUMENTS

| | | | | |
|---|---|---|---|---|
| 3,868,805 | A | 3/1975 | Battersby | |
| 4,708,762 | A * | 11/1987 | Lenhardt | 156/556 |
| 5,136,974 | A * | 8/1992 | Lisec | 118/673 |
| 5,797,546 | A * | 8/1998 | Reed et al. | 239/280.5 |

FOREIGN PATENT DOCUMENTS

| | | | |
|---|---|---|---|
| AT | 403 912 | B | 6/1998 |
| DE | 44 38 125 | C1 | 2/1996 |
| EP | 0 471 247 | A1 | 2/1992 |
| EP | 1 655 443 | A2 | 5/2006 |

* cited by examiner

*Primary Examiner* — Yewebdar Tadesse

(74) *Attorney, Agent, or Firm* — Modiano & Associati; Albert Josif; Daniel O'Byrne

(57) ABSTRACT

An automatic machine for versatile and alternative application of at least two types of sealant along the perimetric rim of an insulating glazing unit, whose spacer frame is constituted preferably but not exclusively by a continuous strip of expanded synthetic material. In particular, the machine allows simple and quick switching from one sealant to another, since the path of the plurality of sealants which starts from their feed, be they of the hot and/or cold extruded type, uses a plurality of ducts which reach the extrusion nozzles that are active proximate to the perimetric rim of the insulating glazing unit.

8 Claims, 13 Drawing Sheets

AUTOMATIC MACHINE FOR VERSATILE AND ALTERNATIVE APPLICATION OF AT LEAST TWO TYPES OF SEALANT ALONG THE PERIMETRIC RIM OF AN INSULATING GLAZING UNIT

The present application relates to an automatic machine for the versatile and alternative application of at least two types of sealant along the perimetric rim of the insulating glazing unit in which the spacer frame is constituted preferably but not exclusively by a continuous strip of expanded synthetic material.

BACKGROUND OF THE INVENTION

Currently it is known to deposit the spacer frame or the spacer profile on a glass pane and then couple the assembly to a second glass pane and seal it so as to constitute the so-called insulating glazing unit. The operation can also be repeated in order to obtain an insulating glazing unit constituted by three glass panes and two spacer profiles or frames, as well as n glass panes and n−1 spacer profiles or frames.

In order to better understand the configuration of the glass pane, not so much in its possible isolated use but above all in its use in combination with other components, in particular the spacer profile or frame for constituting the so-called insulating glazing unit, some concepts which relate to said intermediate components, i.e., the glass pane and the spacer profile or frame and the end product, i.e., the insulating glazing unit, are summarized hereinafter, under the assumption that the subsequent use of the insulating glazing unit, i.e., as a component of a door or window, is known. To allow efficient description, the end product is first described and then its components.

The insulating glazing unit is constituted by composing two or more glass panes, which are separated by one or more spacer frames which are generally metallic, for example made of aluminum but also made of rigid plastic material, and are hollow and finely perforated on the face directed toward the inside. The spacer frames contain, in their hollow part, hygroscopic material which is intended to trap the moisture that inevitably is diffused in the air when the insulating glazing unit is being manufactured, as well as the moisture which might penetrate subsequently in the case of less than perfect tightness of the assembly that constitutes the insulating glazing unit. The air space (or spaces) delimited by the glass pane or panes can contain air or gas or mixtures of gases which give the insulating glazing unit particular properties, for example heat insulation and/or soundproofing properties. Recently, the use of a so-called spacer profile has become widespread; said spacer profile has a substantially rectangular cross-section and is made of expanded synthetic material (by way of non-limiting example, silicone and EPDM), which incorporates within its mass the hygroscopic material.

This type of spacer profile, and in particular its sealing requirements with respect to the glass panes coupled thereto, is the subject of the present patent application.

The coupling between the glass panes and the frame (or frames), in the traditional case with the frame 1, is obtained by means of two levels of sealing: the first one being intended to provide tightness and an initial bonding between said components and involving the lateral surfaces of the frame and the portions of the adjacent glass panes; and the second one, having the function of providing permanent cohesion among the components and mechanical resistance of the joint between them, and involving the compartment constituted by the outer surface of the frame and by the faces of the glass panes in the region between the outer surface of the frame and the rim thereof (see FIGS. 1A-1E).

Such innovative profile has two advantages: the low coefficient of heat transmission by conduction and the first level of bonding with the glass, said bond being instantaneous since may be entrusted to the acrylic adhesive and not to the traditional thermoplastic sealant, the latter being subject to flow until the second sealant, described hereinafter, catalyzes.

The first sealing can be performed, for example, by means of polyisobutyl sealant (abbreviated as PIB), with heating.

The second sealing can be typically performed by using the following range of products:

- cold two-component polysulfide sealant (PS)
- cold two-component polyurethane sealant (PU)
- cold two-component silicone sealant (SI)
- cold single-component polysulfide sealant (PS)
- cold single-component polyurethane sealant (PU)
- cold single-component silicone sealant (SI)
- and, rarely, hot catalyzing butyl sealant (HM).

The respective abbreviations/acronyms are provided in brackets and are the same for the two-component or single-component versions, since this aspect is irrelevant in terms of the description of the invention. The term "cold" references ambient temperature.

In the case of a spacer profile 1', 1" made of expanded synthetic material, the first level of sealing is replaced by an adhesive, for example an acrylic adhesive, although it does not have tightness functions (which are transferred to the next levels), which is already spread onto the lateral faces of the spacer profile 1', 1" and covered on said faces by protective films which must be removed before use. The next sealing levels can be summarized in the following cases (for the sake of brevity, the abbreviations cited above are used):

only HM; PIB+PS; PIB+PU; PIB+SI.

It should be noted that the final sealing with silicone is required for so-called structural uses, i.e., uses in which the final sealant is entrusted with the tough and resilient retention of the pane which faces outward. This sealant, being exposed to ultraviolet radiation, can only be made of silicone.

The above is provided in order to present types of products and sectors of use which are expanding increasingly: the products (insulating glazing unit) because they have the spacer frame made of a material with a low heat transmission coefficient, and the sector because it comprises the sector of architectural structures in which the glazing unit is no longer just an infilling material but assumes structural functions so as to form so-called curtain walling or structural glazing.

Generally, the glass panes 2 used in the composition of the insulating glazing unit 3 can have different shapes depending on their use: for example, the outer glass pane (understood with respect to the inner space of a building) can be normal or reflective (in order to limit thermal input during summer months) or laminated/armored (for intrusion/vandalism prevention functions) or laminated/tempered (for security functions) or combined (for example reflective and laminated to achieve a combination of properties), the inner pane (understood with respect to the inner space of a building), can be normal or of the low-emissivity type (in order to limit heat dispersion during winter months) or laminated/tempered (for security functions) or combined (for example low-emissivity and laminated in order to obtain a combination of properties).

A manufacturing line for obtaining the insulating glazing unit product 3 requires many processes in sequence, which are preferably automatic, and in particular comprises the operations of applying the spacer frame 1 or the spacer profile 1', 1" and sealing.

Processes for manufacturing the insulating glazing unit 3, each requiring a corresponding and particular machine to be arranged in series with respect to the other complementary ones, are, by way of nonlimiting example and at the same time not entirely necessary, the following:

EDGING on the peripheral face of the pane to remove any coatings, in order to allow and maintain over time the bonding of the sealants and, in the case of the subject of the present invention, both the bonding of the adhesive and the bonding of the sealants;

GRINDING (so-called "arrissing") of the sharp arrises of the pane in order to eliminate edge defects introduced by cutting the panes into formats and reduce the risk of injury in subsequent handling of the glass pane and of the insulating glazing unit;

WASHING of the individual glass panes, with inner pane/outer pane alternation (the orientation being the one defined above);

APPLICATION OF THE SPACER FRAME: the previously manufactured frame, filled with hygroscopic material and covered on its lateral faces with a thermoplastic sealant (PIB), which has sealing functions, in machines which are external to the production line of the insulating glazing unit 3, is applied to one of the glass panes which constitutes the insulating glazing unit 3 in an appropriately provided station of the production line of the insulating glazing unit 3; as an alternative and more effectively, a continuous strip of spacer profile made of expanded synthetic material 1', 1" is unwound from a reel and applied automatically to one of the two panes until it forms a closed frame which is built directly in adhesion against the glass pane, after removing the protective films, and on the same production line as the insulating glazing unit 3;

MATING AND PRESSING of the assembly constituted by the glass panes and the frame (or frames);

FILLING WITH GAS of the air space (or spaces) thus obtained;

SECOND SEALING (and optionally THIRD SEALING).

The processes set forth above can be performed by a respective machine automatically or semiautomatically.

The background art related to such automatic sealing machines is constituted typically by the following documents:

EP 0 471 247 A1

EP 0 423 106 A1

EP 1 528 214 A1 which teach nothing regarding versatility features of the machines disclosed, such as to equally work with at least two distinct products, but rather propose an opposite teaching.

These documents and the corresponding manufactured machines in fact respectively teach only the following:

EP 0 471 247 A1: to feed a combination of two components, dosed individually, of a two-component product either to the extrusion head of the automatic machine or to a manual device in which mixing and extrusion occur;

EP 0 423 106 A1: a method for controlling the dosage of the sealant, performed also by varying the speed of the elements for moving the insulating glazing unit and the extrusion head; and a possibility to feed the sealant, but always the same sealant, to more than one extrusion nozzle;

EP 1 528 214 A1: feeding the PIB onto the sides of the spacer made of expanded synthetic material before applying it to the glass pane.

Therefore, these teachings are rather opposite, i.e., they prospect a plurality of extrusion user devices which all use the same product.

Other background art has been developed after that of the above mentioned documents that consists of many other documents that are less pertinent than EP 0 471 247 A1.

Background art resides in manufactured machines produced by the inventors as the present application, in which it is possible to convert between two of the three products PS, PU, SI (all of which operate at ambient temperature) but it is always necessary to replace a substantial fraction of the components for feeding the sealant into the extrusion head region, therefore entailing modification times which are not consistent with the demand for prompt versatility that is currently required.

The typical production of an insulating glazing unit manufacturer (regardless of whether the unit has a traditional spacer frame made of aluminum profile or an innovative one made of expanded synthetic material) in fact consists of 80% of the traditional type of insulating glazing unit and 20% of the structural insulating glazing unit type. With such proportions, having several lines for the production of insulating glazing units, each dedicated to one type of product, is not justified, since the proportion which saturates its use would be three lines for traditional production and one line for structural production. In view of the productivity of each line of approximately 500 units in 8 working hours, this configuration would be applicable only for manufacturers which have a production of at least 2000 units in 8 working hours, but typical average production is instead 400 units in 8 hours; hence the need to have an automatic machine which is versatile and therefore allows all of the production line of the insulating glazing unit 3 to also be promptly versatile.

The most important problems of the background art described above are therefore the following:

the need to dedicate a machine to the sealing of the hot PIB type, a second machine for the hot HM product, and a third machine for the cold SI or PU or PS product;

the complexity of the operation for replacing the components for feeding the sealant in the region of the extrusion head in the case of a version of a machine which is potentially preset to replace the circuits;

the excessive use of time for this operation.

SUMMARY OF THE INVENTION

The aim of the present invention is to solve the above-mentioned problems, eliminating all the drawbacks of the cited background art, by providing a machine and a method which allow at least to switch from the PIB product (applied hot) to the HM product (applied hot) and vice versa.

Use of a plurality of sealants to be alternated in sealing the insulating glazing unit 3, or the use of no extrusion machine to apply the PIB directly onto the interface between the spacer frame and the glass panes are envisaged, since this extrusion is performed separately against the lateral faces of the spacer profile 1', 1" just after unwinding thereof from a reel in which it is contained (the supply condition of the profile made of expanded synthetic material providing for reels).

Within this aim, an object of the invention is that of providing a machine that allows to perform automatically a second sealing, and optionally, a third sealing, in order to provide flexibility in the production of the types of insulating glazing unit so that the same machine can at least perform the following automatic operations: application of PIB or application of HM, conversion between these methods of operation having to be simple, quick and safe.

Another object of the invention, which however can be solved with a more complex configuration, is to allow switching between the PIB product (applied hot), the HM product (applied hot), and one of the PS, PU, SI products (applied cold), so as to be able to perform in the same machine sealing with HM alone in the case of a traditional insulating glazing unit in which the spacer frame is made of expanded synthetic material; or with PIB (applied hot) first (accumulating a batch of manufactured units) and then with SI (applied cold) in the case of a structural insulating glazing unit in which the spacer frame is made of expanded synthetic material; or, within the constraints of the dimensions of the extrusion head, in any other combination comprising one or more products to be applied hot with one or more products to be applied when cold, in any case with a minimum of two products.

This aim and this and other objects which will become better apparent hereinafter are achieved by a machine that has the features set forth in claim 1.

The invention in its preferred embodiments provides new features, all of which differ from the background art, such as:

installation in the hollow part of the extrusion head of a plurality of terminal elements for the feed path of the various sealants which are rigidly coupled to said head;

installation, in the hollow part of the extrusion head, of a plurality of mixers as elements of the sealant feed path, in the case of a two-component sealant, rigidly coupled to said head;

installation, in the hollow part of the extrusion head, of path elements which are different from the mixers and of path elements constituted by mixers;

arrangement of the oscillation axis at an adequate distance from the insulating glazing unit 3 so as to allow a stroke which is substantially linear, since it uses an arm of considerable length, proximate to the perimeter of the insulating glazing unit;

balancing said elements and/or mixers and subsequent nozzles by means of a counterweight so as to neutralize the action toward the perimeter of the insulating glazing unit and of its components such as the glass pane and the spacer frame;

and finally, but as an important inventive concept, the ability to switch the orientation of the extrusion nozzles in order to connect the type of nozzle that is in contact with the perimeter of the insulating glazing unit to be sealed, and the corresponding terminal feed duct, to the type of sealant used for the chosen sealing stage (for example PIB alternately with HM).

The machine according to the invention is suitable thus to operate according to a new and inventive method, the steps whereof are clearly apparent, for the person skilled in the art, from the following description, and comprised in claim 14.

BRIEF DESCRIPTION OF THE DRAWINGS

Further characteristics and advantages of the invention will become better apparent from the description of a preferred but not exclusive embodiment of the invention illustrated by way of non-limiting example in the accompanying drawings, wherein:

FIG. 1A: normal, FIG. 1B: triple glazing unit, FIG. 1C: offset glass panes, FIG. 1D: normal outer pane and low-emissivity inner pane, FIG. 1E: tempered reflective outer pane and laminated low-emissivity inner glass pane. FIGS. 1A, 1B, 1C show the traditional spacer frame 1 and the two types of sealant used: in black, the butyl sealant (PIB) 1001, which acts as an initial binder among the components and as a seal (first seal) and is applied between the lateral surfaces of the frame and the glass panes; in broken lines, the polysulfide (PS) or polyurethane (PU) or silicone (SI) sealant 1002, which has a mechanical strength function (second sealing) and is applied between the outer surface of the frame and the faces of the glass panes up to their edge. FIGS. 1D, 1E illustrate the spacer frame obtained by means of an innovative spacer profile 1' and 1" made of expanded synthetic material covered with adhesive (as a replacement of the first seal). In the case of FIG. 1D, the sealant (HM) that constitutes the second seal 1002 is shown with hachures, and the cross-hatching indicates the spacer profile made of expanded synthetic material, which is of the so-called Super Spacer normal type with a rectangular cross-section 1'. In the case of FIG. 1E, the sealant (PIB) which constitutes the second seal 1002 is highlighted in black lines (the first seal 1001 being assigned, albeit without expectations of tightness but rather as a coupling function, to the acrylic adhesive as mentioned earlier and being shown in FIG. 1E in closely hatched lines); the sealant (PS, PU or SI, but typically SI for structural glazing units) which constitutes the third seal 1003 is shown in normal hatching and the spacer profile made of expanded synthetic material is of the special type known as TriSeal with a contoured cross-section 1", so as to have lateral compartments for accommodating the PIB sealant.

The inner/outer orientation is identified visually by means of icons which represent the sun (outer side) and the radiator (inner side). Said figures clearly show the importance of the spacer frame 1, 1', 1" in the composition of the insulating glazing unit 3, especially in embodiments in which the thicknesses of the glass panes 2 are considerable and therefore so is the weight (as in the case of laminated glazing units), and therefore the use of the spacer profile 1', 1" made of expanded synthetic material, the lateral faces of which are covered with highly effective acrylic adhesive, turns out to be particularly valid, since it allows the instantaneous coupling of the glass panes to the spacer, differently from the butyl sealant according to the background art.

Figure 1A:
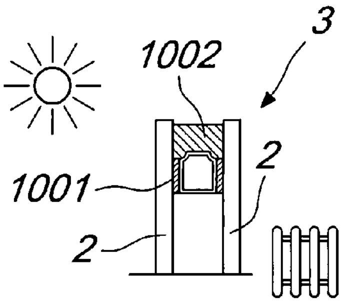
FIGS. 1A-1E are schematic views of the peripheral portion of the insulating glazing unit 3 in an exemplifying but not exhaustive series of possible constructive combinations.
Figure 1B:
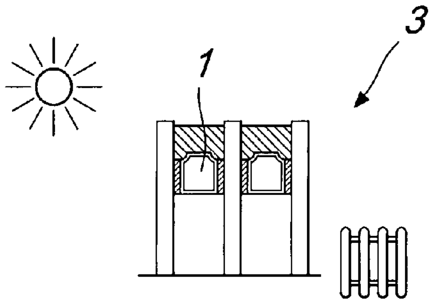
Figure 1C:
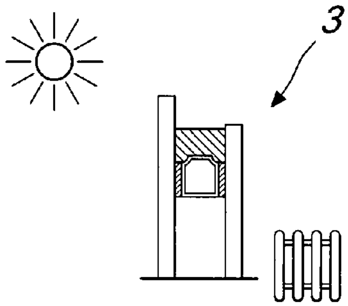
Figure 1D:
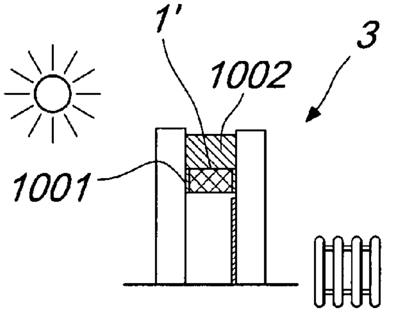
Figure 1E:
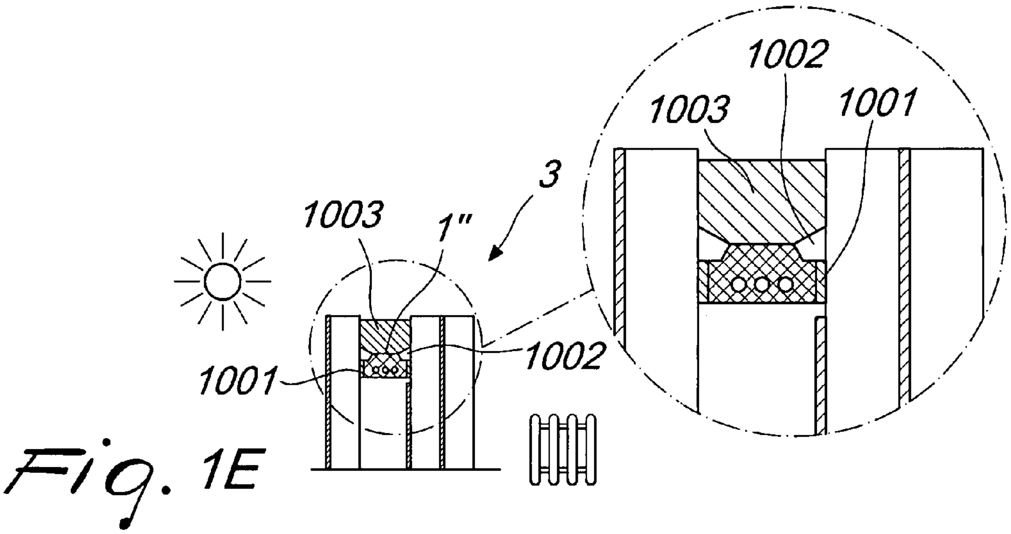
Figure 2:
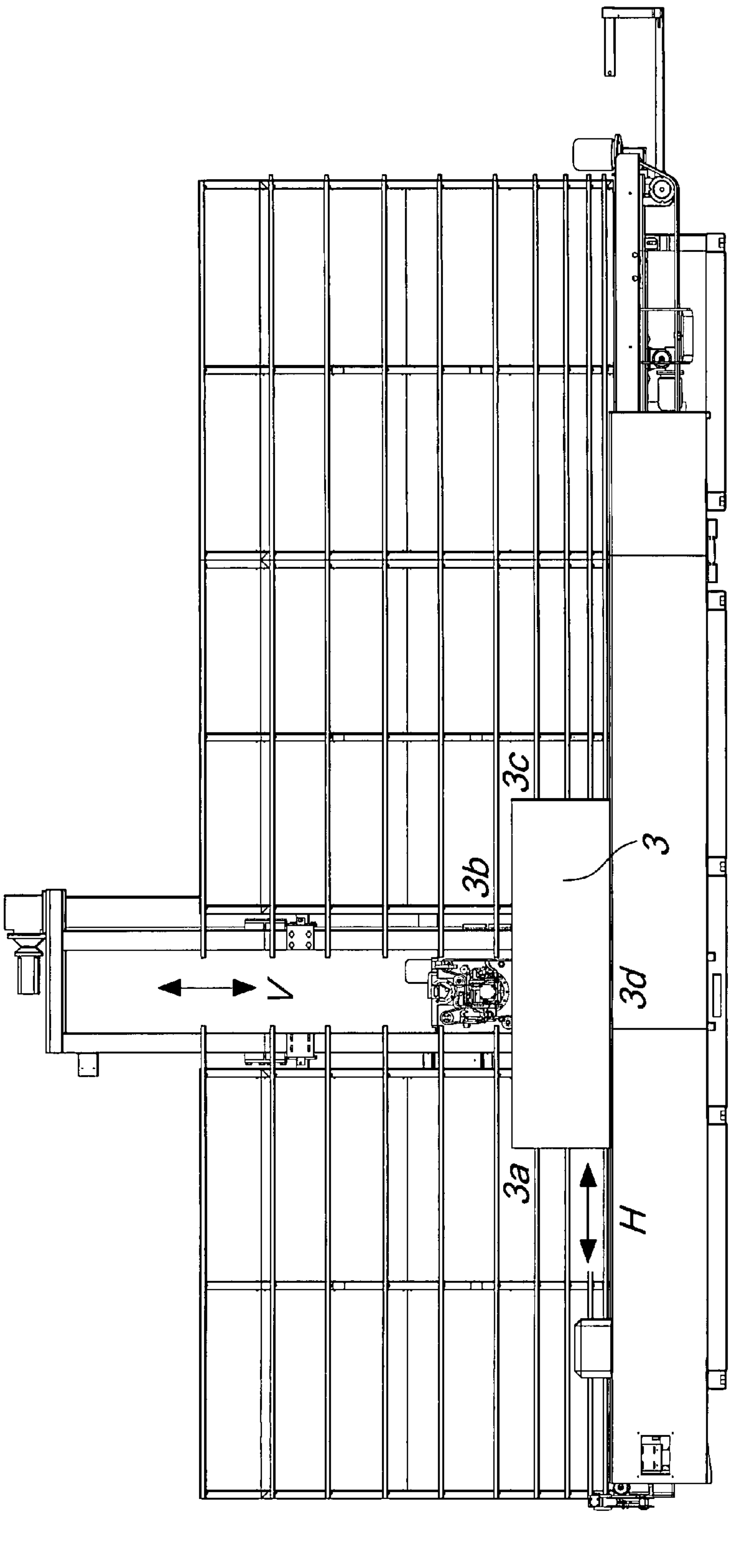
Figure 3:
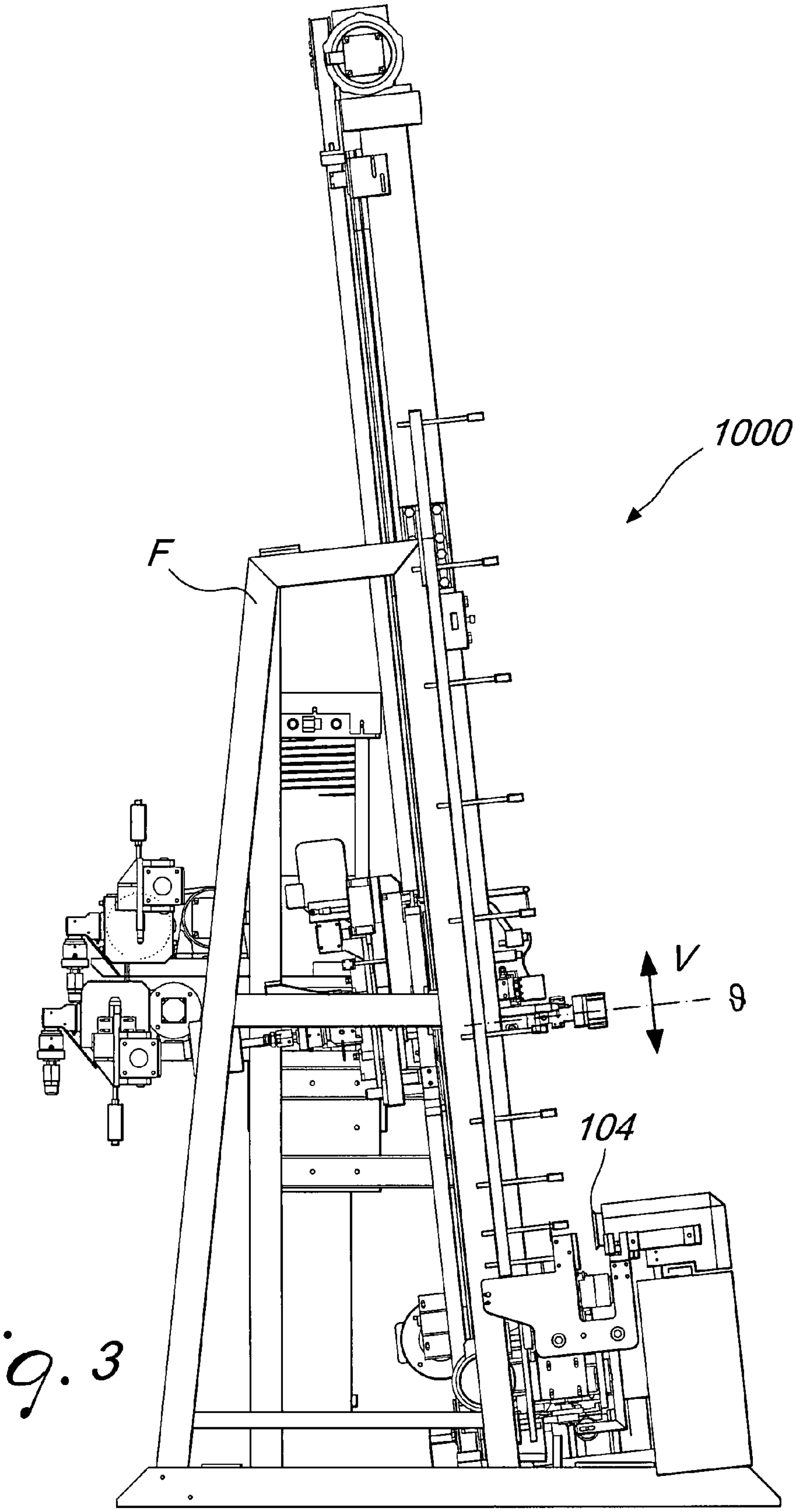
Figure 4:
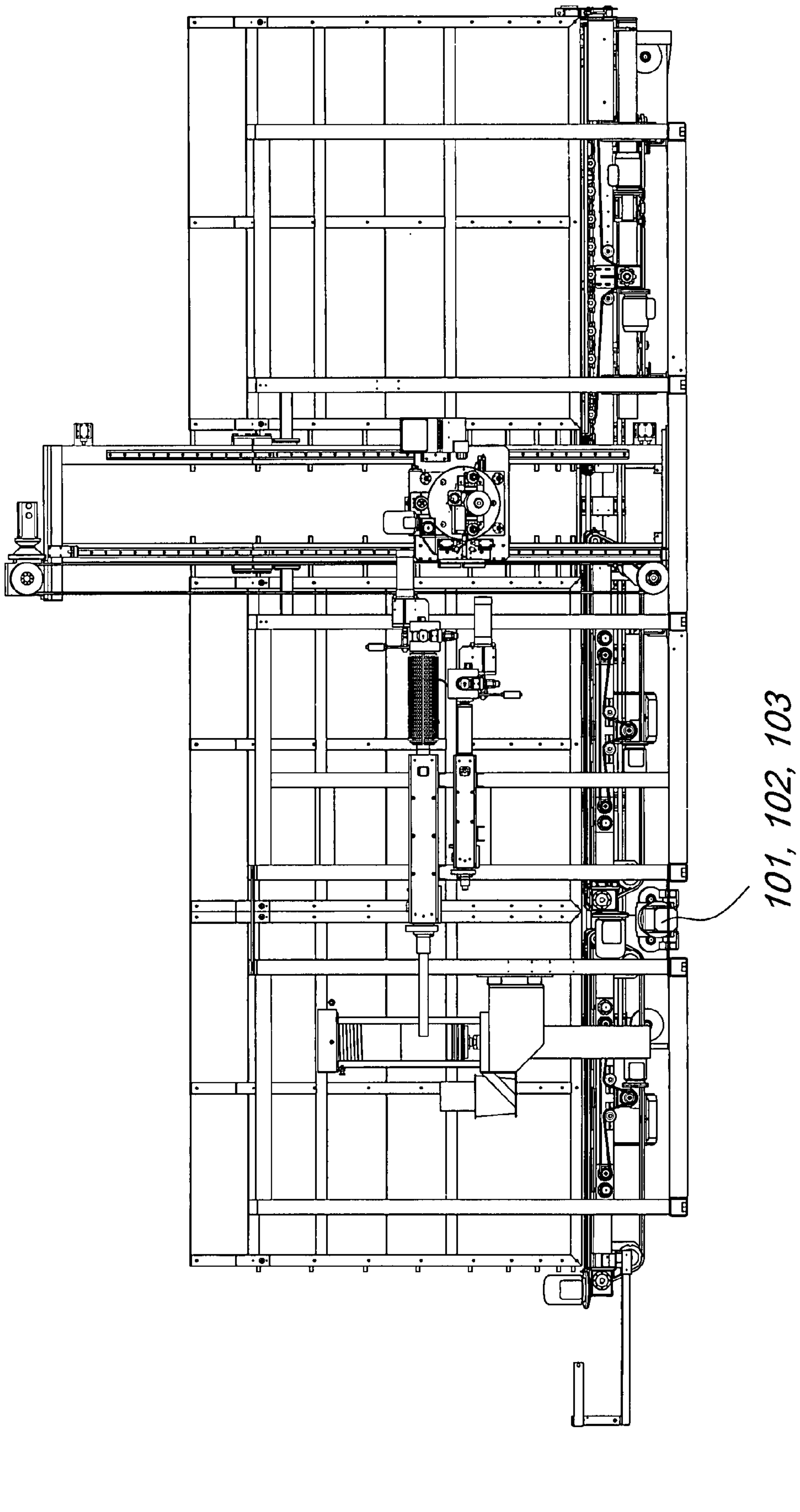

FIGS. 2, 3, 4 illustrate the machine according to the invention, in several views (a general front view, showing the horizontal axis H for the movement of the insulating glazing unit and of the vertical axis V for moving the extrusion head, and with the arrangement of the insulating glazing unit 3, complete with the identification of its sides in the typical progression of the steps of the sealing process; a general side view, with identification of the vertical axis V and of the rotation axis Θ for the orientation of the extrusion nozzles, a complete rear view exemplifying the presence of two PIB/HM dosage units, of the PIB melting unit, the one for the HM being similar, and of an electrical panel).

Figure 5A:
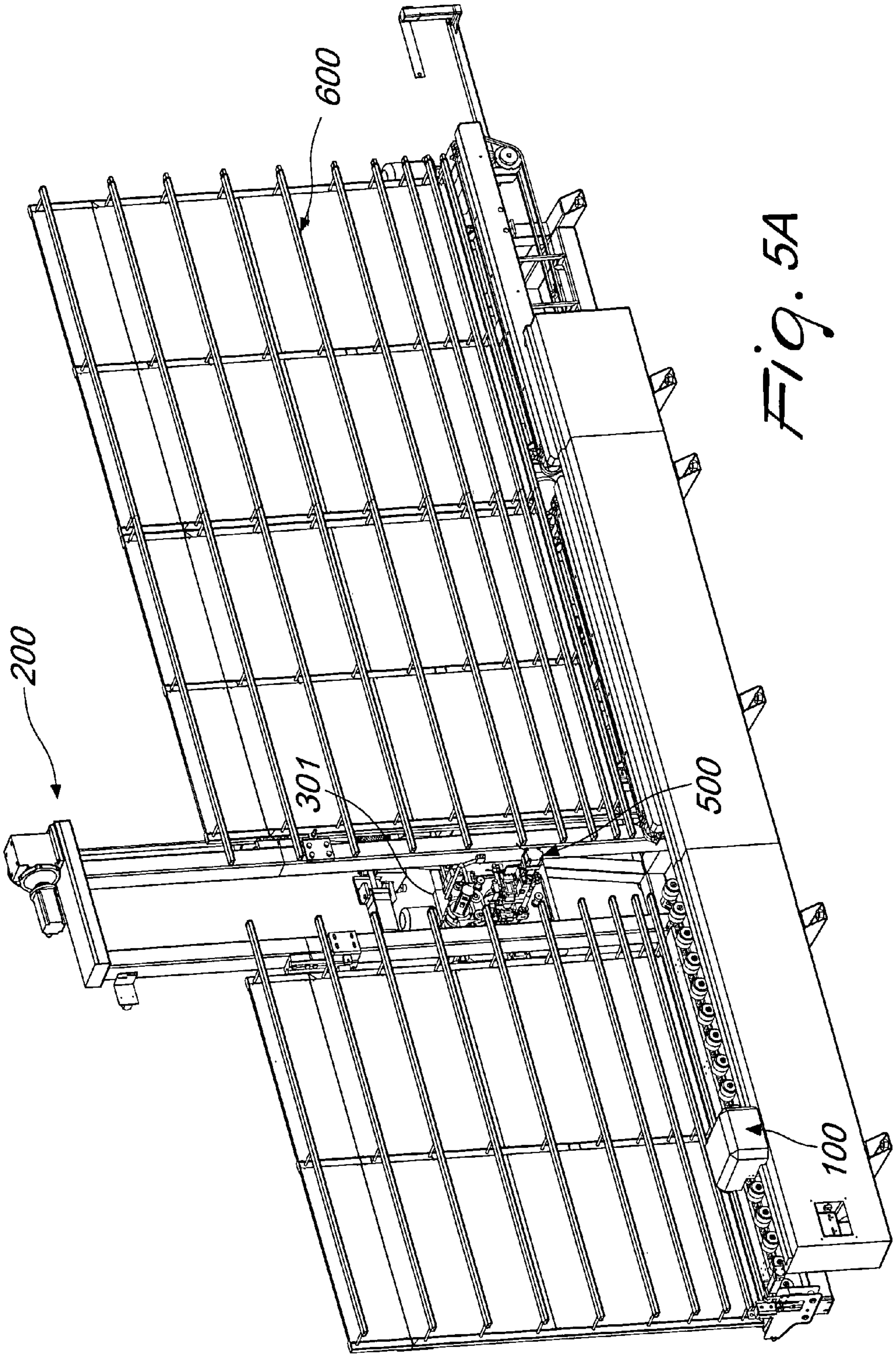
Figure 5B:
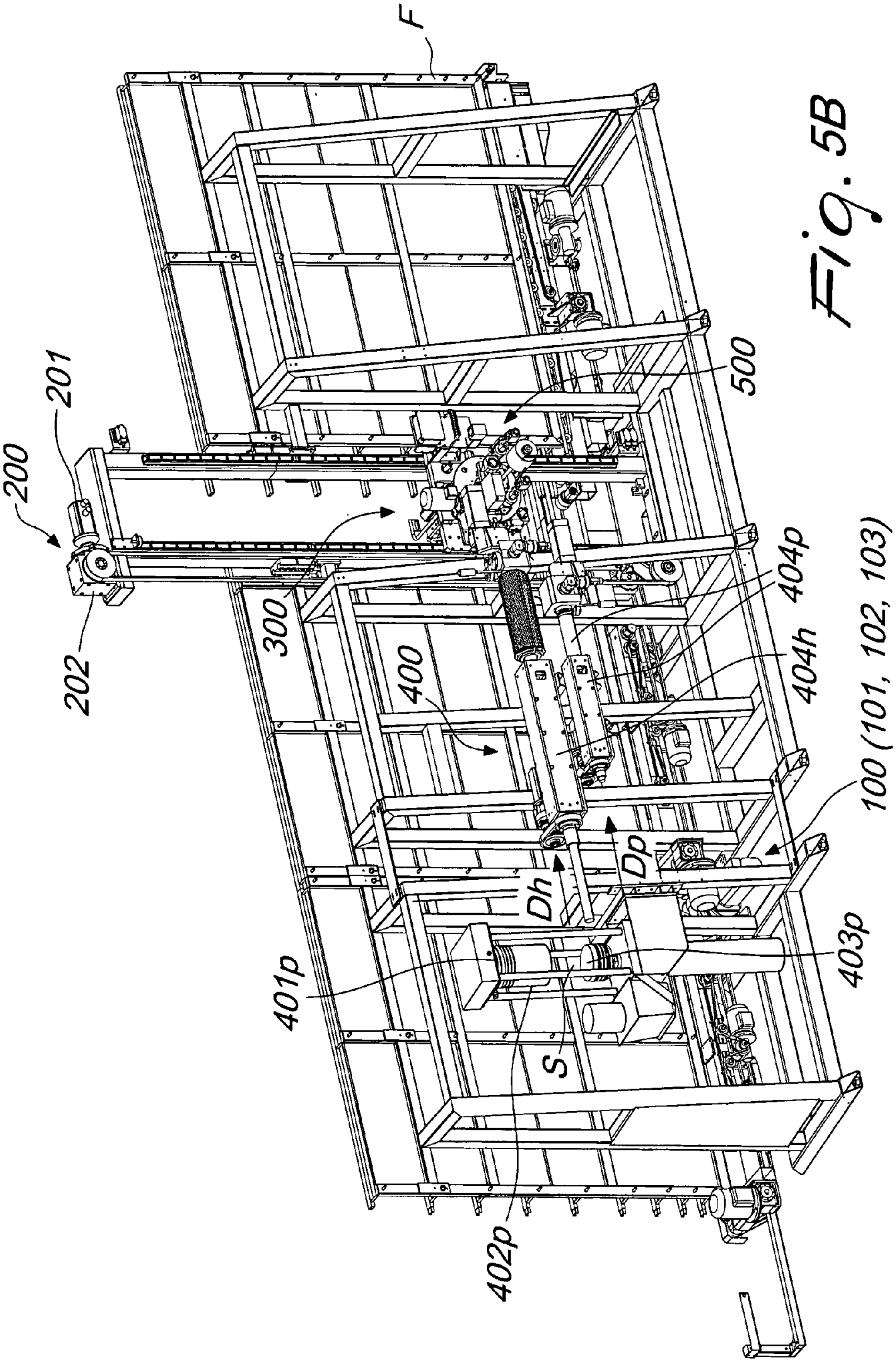

FIGS. 5A and 5B represent in perspective views the main components of the machine, divided into assemblies, designated according to the numbering logic: the 100 series of numerals for the horizontal track, with a sucker-fitted carriage 100 for moving the insulating pane 3 along the horizontal axis H; the 200 series for the vertical track with the extrusion head supporting carriage for moving the extrusion head along the vertical axis V; the 300 series for the assembly for actuating the rotation of the head about the rotation axis Θ; the 400 series for the dosage unit assembly; the series 500 for the assembly with several of the inventive features to which the present application mainly, but not exclusively, relates.

Figure 6A:
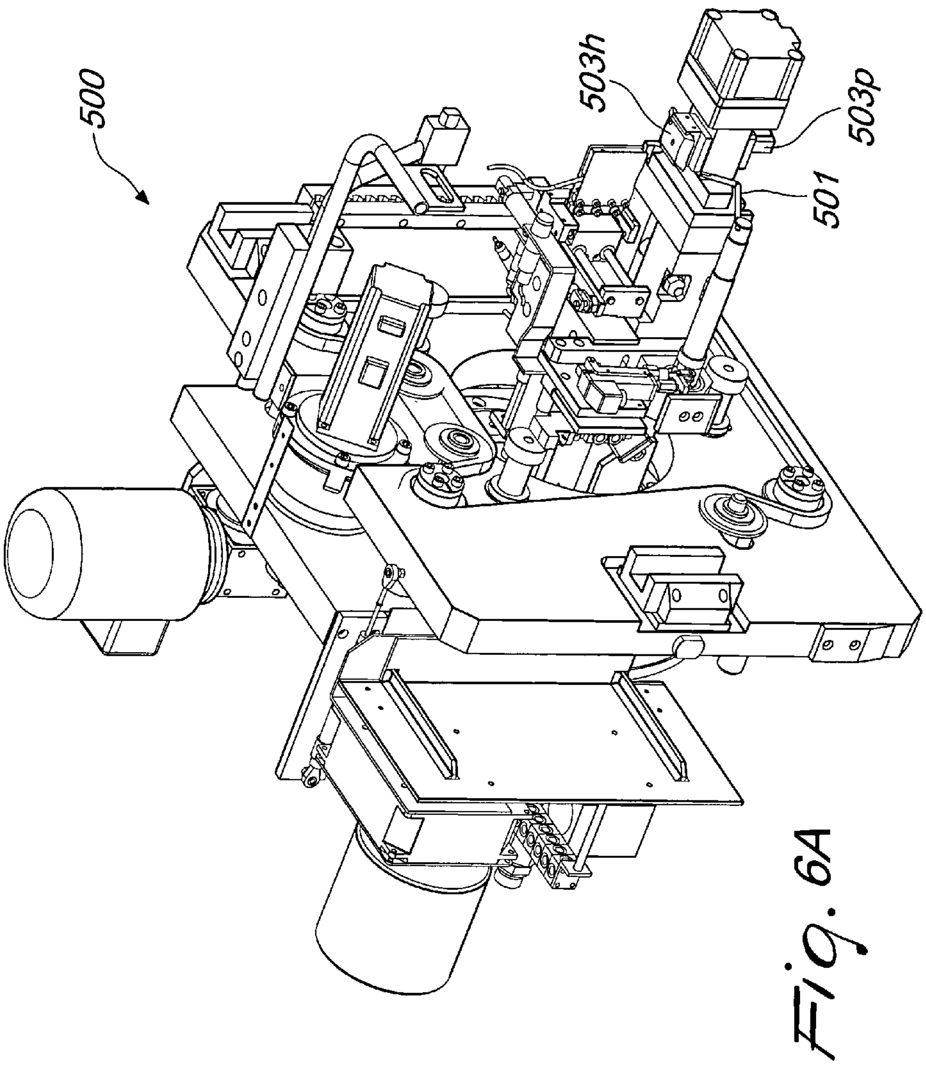
Figure 6B:
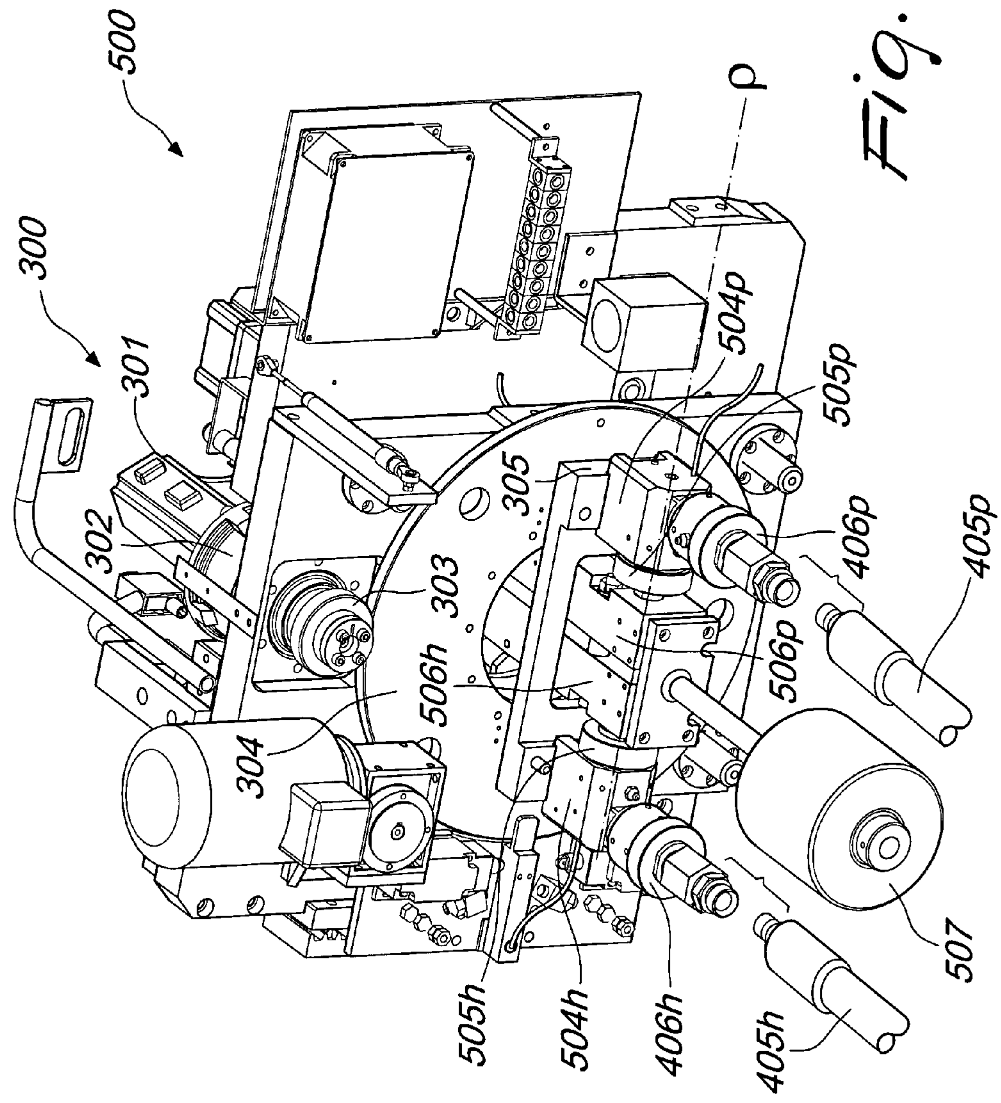

FIGS. 6A and 6B illustrate specifically the assembly (an extrusion head assembly), of the 500 series.

Figure 7:
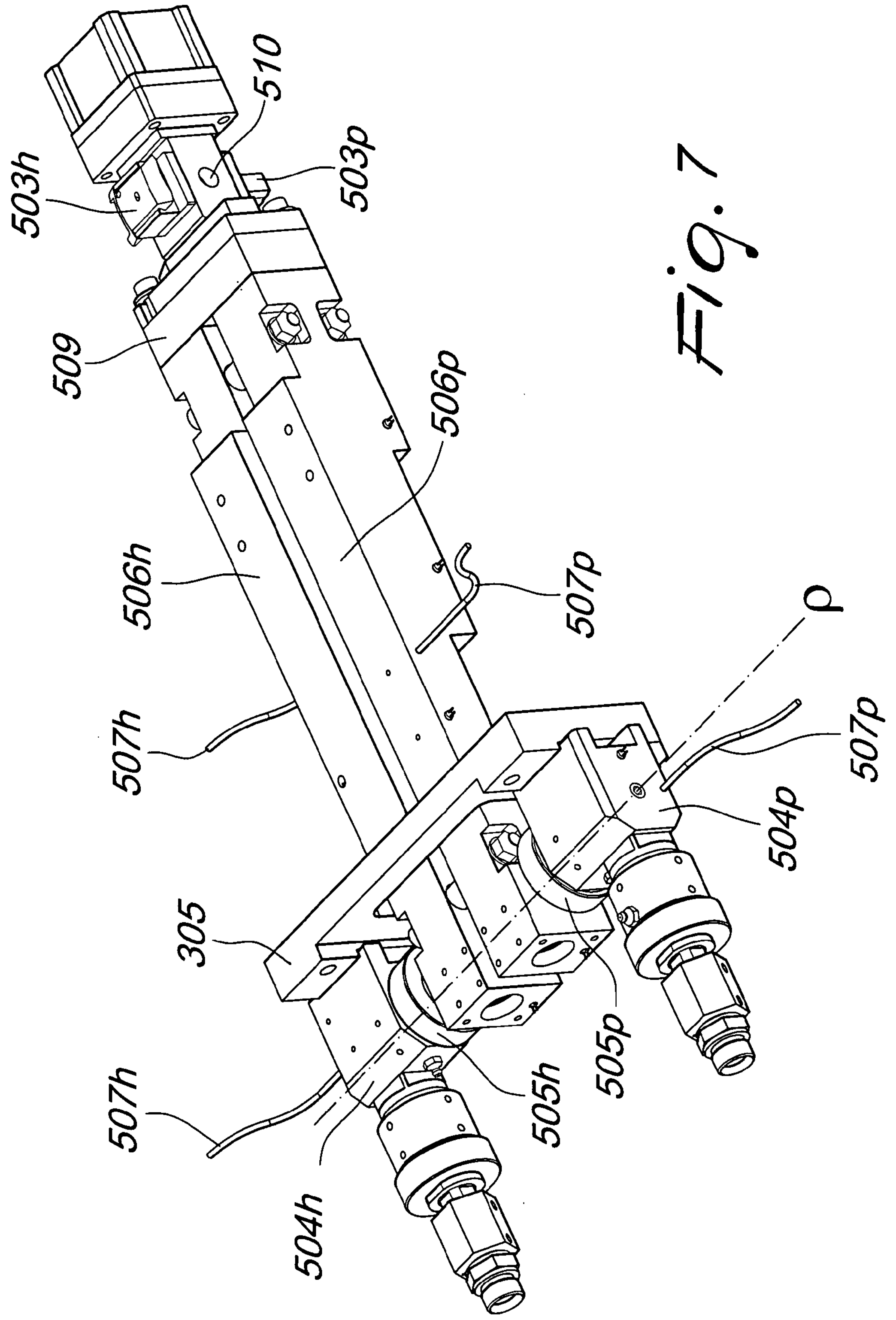

FIG. 7 is a perspective view of details of the assembly of the 500 series.

Figure 8:
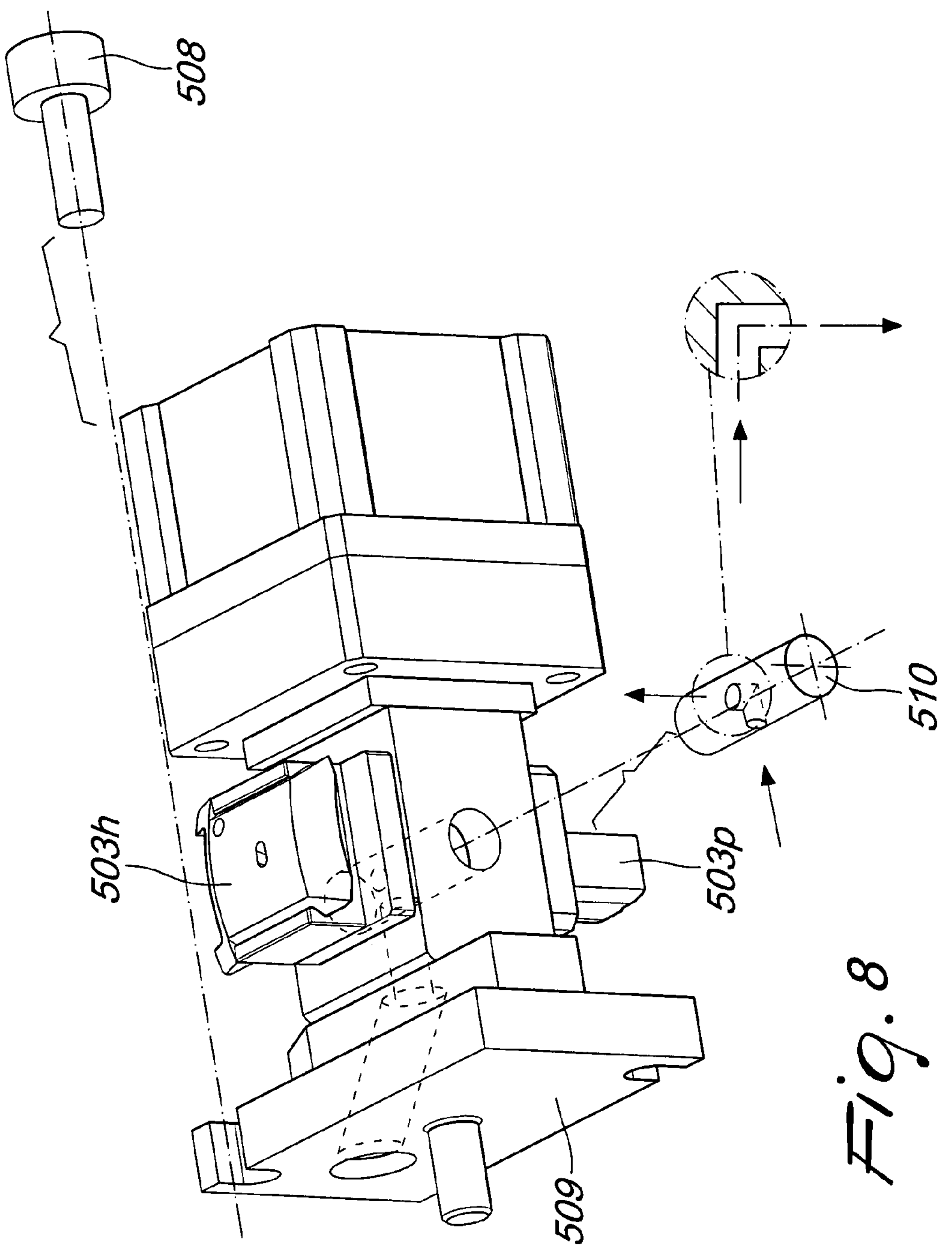

FIG. 8 is a perspective view of the mechanisms for allowing the switching of the orientation of the extrusion nozzles.

Figure 9A:
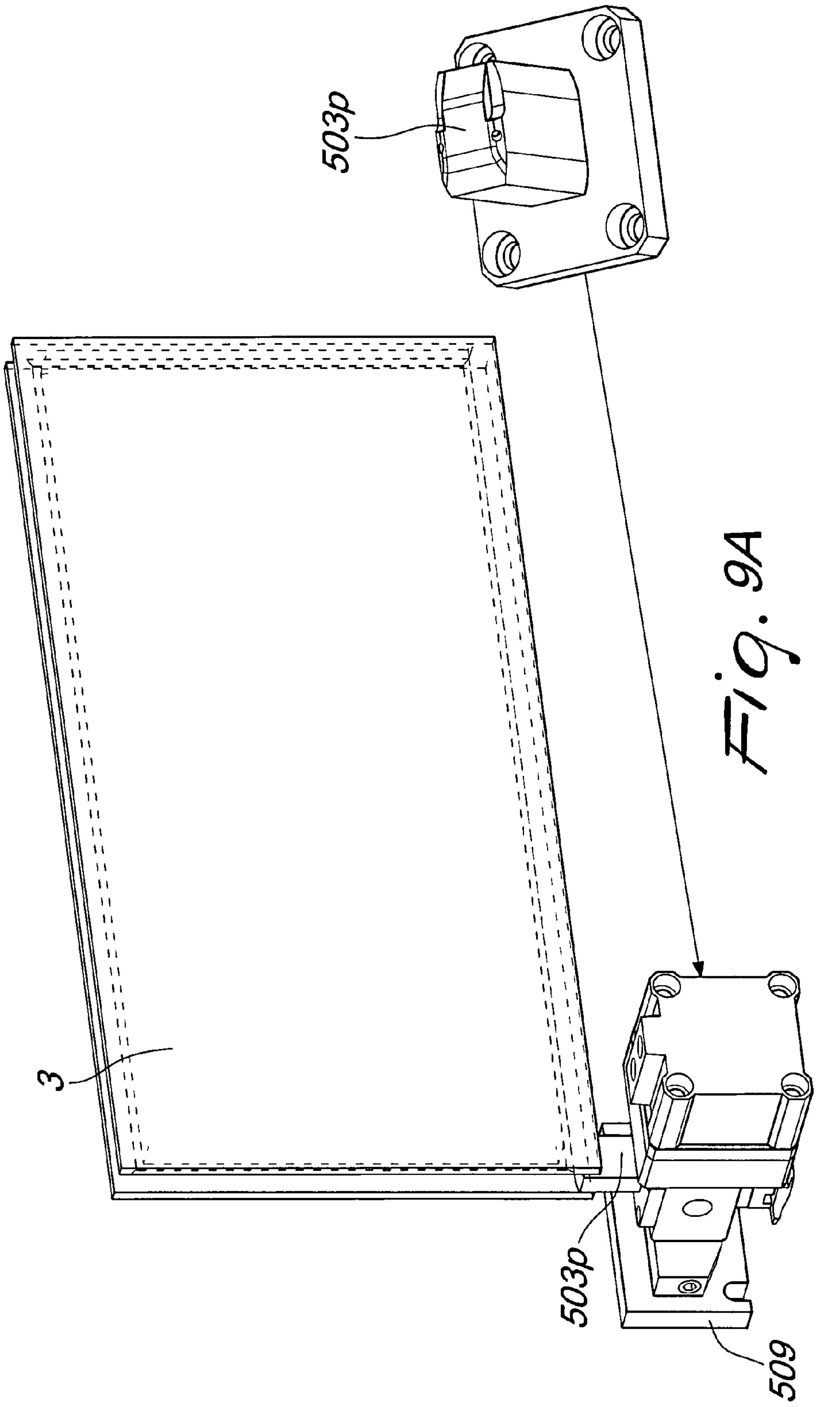
Figure 9B:
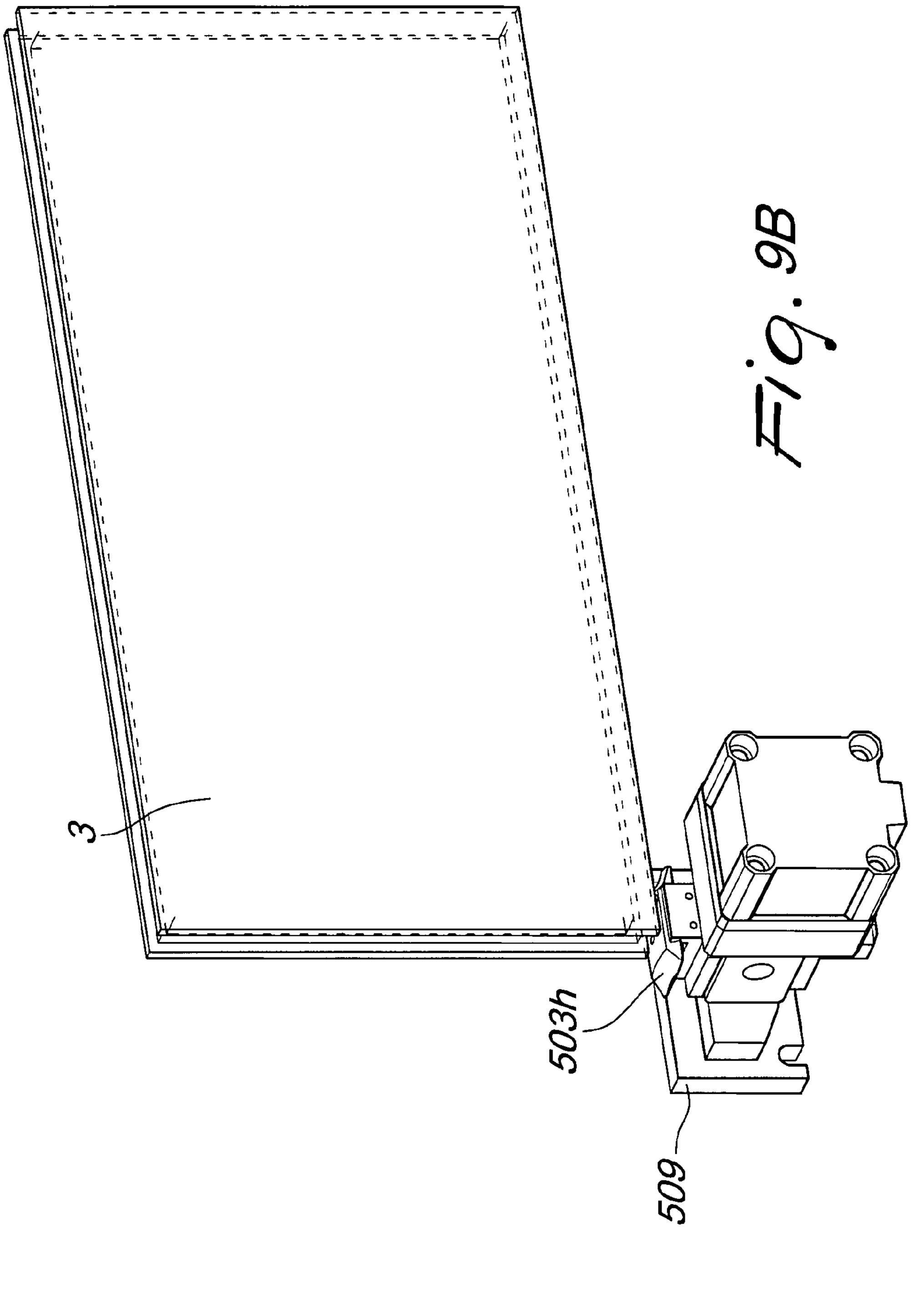

FIGS. 9A and 9B illustrate the details of the extrusion nozzles mated with the perimetric part of the insulating glazing unit 3 during an extrusion step.

Figure 10A:
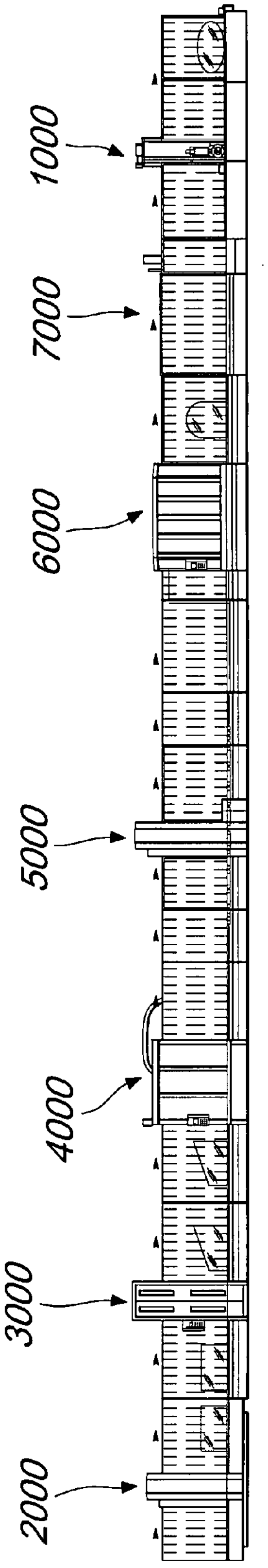
Figure 10B:
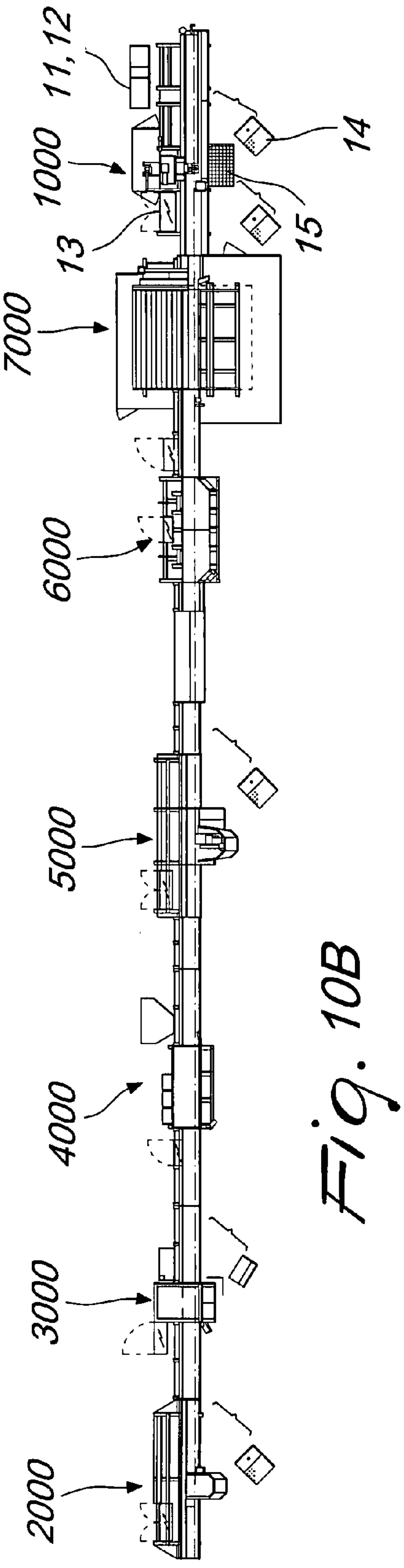

FIGS. 10A and 10B are views of the production line of the insulating glazing unit 3 (in the elevation and plan views) with the machine according to the invention, and includes in the plan view melting units for PIB 11, a melting unit for HM 12, an electrical/electronic panel 13, a control column 14 and protection devices 15.

DESCRIPTION OF THE PREFERRED EMBODIMENTS

We now provide the detailed description of a preferred but not exclusive way of carrying out the invention.

Description of a preferred but not exclusive embodiment of the invention is made hereinafter with reference to FIGS. 1A-1E, 2, 3, 4, 5A, 5B, 10A, 10B for the general configuration and to FIGS. 6A, 6B, 7, 8, 9A, 9B for the description of the details. For the purposes of the description, it is assumed that parts that correspond to FIGS. 2, 3, 4, 5A, 5B are known and therefore do not require a detailed description but only a brief one, since both the previously described prior art and the knowledge of the person skilled in the art do not require particular clarifications for the manufacture of such parts.

Single-digit reference numerals refer to the material being processed, whereas, as already set forth earlier in the description, three-digit reference numerals refer to the components of the machine and reference numerals which end with two zeros refer to each assembly of the machine. Four-digit reference numerals refer to the machines that belong to the production line of the insulating glazing unit 3, in which the machine 1000 is the one to which the present application particularly relates.

In particular, the reference numerals 1', 1" designate a spacer profile made of expanded synthetic material, without excluding operation of the machine also with spacer profiles made of a different material, so long as said material is compatible with the mechanisms described hereinafter; the reference numeral 2 designates a glass pane, equally the one directed toward the operator and the one that lies opposite and another intermediate pane or other intermediate panes (in the case of an insulating glazing unit composed of more than two glass panes) affected by the application of the PIB and/or HM sealant); the reference numeral 3 designates an insulating glazing unit. These reference numerals have already been used in the previous description.

Two-digit reference numerals are also used as follows: the reference numeral 11 designates a melting unit for the PIB sealant; the reference numeral 12 designates a melting unit of the sealant AM; the reference numeral 13 designates an electrical/electronic panel, the reference numeral 14 designates a control column, and the reference numeral 15 designates protective structures, which can be mechanical barriers or optical barriers or laser barriers or electrically sensitive mats et cetera, since particular attention is dedicated not only to the functional, economic and ergonomic aspects that are specific to the content of the present invention but also to aspects related to accident prevention.

One preferred way of carrying out the invention is the one described hereafter; the listing of the various components whereof, albeit not numerous, is to be considered in the context of the flow of the sealants along the paths (pipes and components) to travel from the melting units 11, 12 to the perimeter of the insulating glazing unit 3.

The terms used herein are intended to have the significance indicated hereinafter: "vertical", "substantially vertical" or "pseudovertical", it is understood to refer to a slight inclination with respect to the vertical, (in the range of about 6°), since the transport of the glass pane 2 or of the insulating glazing unit 3 along the entire production line occurs on conveyors whose supporting surface is inclined by approximately 6° with respect to the vertical plane.

Likewise the lower transport/support parts and rollers have an axis which is inclined by approximately 6° with respect to the truly horizontal plane. Accordingly, when using the term "horizontal", this will be understood to mean a slight inclination, in the order of about 6°, with respect to the horizontal.

The insulating glazing unit 3, in the processing step in which it is composed of at least two glass panes and at least one spacer frame but is not yet provided with the second and third sealants as defined earlier, is fed from a previous processing machine, typically a coupling/pressing unit 6000 or a gas filling unit 7000, or is fed manually or by means of a loading unit, onto the known input conveyor of the machine 1000 according to the present invention, the machine comprising a body structure F that bears a pseudovertical support 600 that supports the glazing unit 3 to be processed. The glazing unit 3 advances, conveyed by support and advancement rollers or belts, but kept in step by means of a synchronous actuation. The actuation is constituted by a horizontal carriage 100 actuated by a synchronous motor 101 by means of a reduction unit 102 and belts drive 103 and other known components. The unit 3 advances up to a sucker 104 which mates with the glass pane on the operator side, and up to a slowing sensor and a directly subsequent stop device, both of which are known, so as to position such insulating glazing unit 3 in the correct arrangement, onto the support system 600, with respect to an extrusion head 500 and allow the beginning of the process for applying the PIB sealant or the HM sealant.

Previously, the head assembly 500, which can move vertically since it is applied to a vertical carriage 200, supported so as to be guidingly movable on the body structure F of the machine (see FIGS. 5A-5B), by way of the action of a synchronous motor 201 and a reduction unit 202 and other known components, all of which control the vertical motion of the head assembly 500, has been arranged in the condition for beginning the process. The head assembly 500 is also provided with a rotary motion, about a rotation axis Θ which is actuated by a rotation assembly 300 rotatable about the axis Θ by means of a synchronous motor 301, a reduction unit 302, a toothed pinion 303 and a ring gear 304, which act on the center bearings for centering and supporting the hollow shaft (components the structure whereof is known and which are referenced here as containing internally and in a cantilever fashion the devices that belong to the assembly 500).

At this point, the synchronized motions, the horizontal one of the insulating glazing unit 3 by means of the mechanisms and actuations of the section 100, the vertical one of the head assembly 500 by means of the mechanisms and actuations of the section 200, the rotary one of the head assembly 500 by means of the mechanisms and actuations of the series 300 (which act to turn through 90° in order to switch the orientation of a nozzle 503*h* or of a nozzle 503*p* so as to interface with the vertical side or with the horizontal side of the rectangular insulating glazing unit, or to perform finite or progressive rotations to interface a nozzle 503*h* or a nozzle 503*p* or other nozzles with the perimeter region of the insulating glazing unit when it has non-rectangular shapes), in their interaction, initially bring into contact the perimetric region or rim of the insulating glazing unit with the extrusion nozzle and retain it along the entire path, mating with its shape, be it rectangular or non-rectangular. There is no need to delve more in detail with the description of the mechanisms involved that are of a conventional construction, known to the one skilled in the art. Likewise, the elements related to the distribution of the sealant starting from storage up to the extrusion nozzle are known and belong to the background art which is nevertheless repeated here for completeness of the description also as regards the known part, i.e., the part related to a single sealant (be it of the hot type or of the cold type and in this second case of the single- or two-component type).

In the case of a hot sealant (in the current art, only of the single-component type, for example the hot melt (HM) type), its path begins from a melting unit 401*h* (part of the dosage assembly 400), which is constituted by a heated parallelepipedal compartment into which the product, generally a so-called cake S also shaped like a parallelepiped, is introduced manually through a hopper 402*h* (part of the dosage assembly 400). Once melted, melting being in any case progressive and therefore the part that has remained for longer having melted, a gear pump 403*h* (part of the dosage assembly 400) transfers it to a dosage unit 404*h* of the known type; by being provided with its own axis Dh which is actuated by a synchronous motor whose actuation is interpolated with the information that arrives from a detector 501 for sensing depth (distance between the outer wings of the glass panes and retracting position of the spacer frame 1, 1', 1"), which is also of a known type, and from a device for measuring the distance between the glass panes 502 (not shown), which is also known, and from the actuation systems which move the axes H or V, or H and V combined in the case of contoured insulating glazing units, said dosage unit doses the stoichiometric quantity of sealant, which flows along a pipe 405*h* for feeding to a rotary coupling 406*h* which is connected to the section 500. Up to this point, a description of the machine was provided with reference to the assemblies and devices inherent to its generic construction-operation. The specific features that enable putting into effect of the invention are comprised mainly by the section-assembly 500. A plate 305 is rigidly coupled to the gear 304 and therefore can rotate with it and accommodates an articulation 504*h* (where the index h stands for HM). This articulation receives the HM sealant through the rotary coupling and conveys it through a rotary coupling 505*h* to a duct 506*h*. All this can be seen in FIG. 6*b*, which also includes the details 504*p*, 505*p*, 506*p*, the index p of which stands for PIB, which will be described hereinafter. Conveniently, the articulation 504*h* in combination with the articulation 504*p*, through the inside of which the sealants pass, constitute a fulcrum for the ducts 506*h* and 506*p*, which therefore can oscillate about the oscillation axis p by using a counterweight 507 to balance the cantilever extensions that pass through the hollow shaft which begins with the gear 304 and arrive at the extrusion nozzles 503*h*, 503*p*, of which 503*h* is the point of arrival of the FM sealant.

In the case of an alternative sealant, again of the hot PIB (polyisobutylene) type, its path begins from a melting unit 401*p*, constituted by a heated parallelepipedal block in the cylindrical continuation 402*p* of which the product, generally a so-called cake S which also is cylindrical, is introduced manually. Melting is in any case progressive and the part of the product that has remained stationary for longer is melted. Once the melt product is obtained, a pusher 403*p* transfers it to a dosage unit 404*p*, of the known type, which is provided with its own axis Dp actuated by a synchronous motor and doses the PIB sealant, as explained earlier for the HM sealant. In the same manner as in the description of the path for the HM sealant, the PIB sealant can reach the extrusion nozzle 503*p* through the components 404*p*, 405*p*, 406*p*, 504*p*, 505*p*, 506*p*.

The combination of these two sealant path descriptions is clearly illustrated in FIG. 7, which also shows the wires for supplying power to the heating resistors 507*h* and 507*p* for heating the ducts, since the products discussed so far in the description are of the hot type; said figure illustrates one of the preferred embodiments, and the other ones can be constituted by the following combinations:

a heated duct such as 506*p* for the PIB product and an unheated duct such as 506*f* (f stands for "cold", i.e., ambient temperature) for feeding a cold single-component product;

a duct such as 506*p* for the PIB product and a known mixing unit, which has similar dimensions to the duct, for feeding a cold two-component product, two pipes such as 405*f* converging to said mixing unit on two rotary couplings such as 406*f*, the sealant being composed of a base product and a catalyst product, as known;

two unheated ducts such as 506*f* for feeding two cold single-component products;

two known mixers, whose space occupation is similar to that of the ducts 506*f*, for feeding two cold two-component products, and at which pipes such as 405*f* and rotary couplings such as 406*f* converge, the sealants being each composed of a base product and a catalyst product as known;

all the possible combinations of three sealant products among the eight available: HM, PIB, single-component PS, single-component PU, single-component SI, two-component PS, two-component PU, two-component SI.

FIG. 8 illustrates the mechanisms for allowing switching of the product, in order to draw either the one that arrives from the duct 506*h* or the one that arrives from the duct 506*p*; this is obtained by loosening screws 508, turning a plate 509 and tightening the screws 508 again and, since the nozzles 503*h*, 503*p* can be switched, by acting on a three-way, two-position cock 510. Of course, other combinations can provide the same result, for example the use of a plate 509 which again is able to rotate and is provided with double holes, each hole being connected to a single nozzle, and by resorting to the blocking of the product that is not used upstream of the ducts such as 506.

The description given above and the corresponding figures refer to a sealing machine 1000, with respect to which the source machine (gas filler 7000 or coupling unit 6000) is arranged to the left and the destination machine, if any (a possible additional sealing machine for additional combinations of products), is arranged to the right thereof (with reference to the flow of the process); it is easy to imagine a description and corresponding figures in the case of mirror-symmetrical or otherwise different arrangements.

Of course, all the movements linked to the steps of the cycle are mutually interlocked with the aid of a logic system which is parallel but always active in order to avoid, during the process, conditions of mutual interference between actuator elements and the material being processed.

As is readily available to those skilled in the art, the machine allows simple and quick switching from one sealant to another since the paths of the plurality of sealants that start from their feeds, be they of the hot- and/or cold-extruded type, use multiple ducts which reach the extrusion nozzles which are active proximate to the perimetric rim of the insulating glazing unit.

The present invention is susceptible of numerous constructive variations (with respect to what can be deduced from the drawings, the details of which are evident and eloquent), all of which are within the scope of the appended claims; this applies, for example, to the mechanical solutions to allow the switching of the nozzles (503*h*, 503*p*), for extrusion, to the switching means which can be electrical, electric-electronic, pneumatic, hydraulic and/or combined, et cetera, to the control means, which can be electronic or fluid-operated and/or combined, et cetera.

The constructive details can be replaced with other technically equivalent ones. The materials and the dimensions may be any according to requirements in particular arising from the dimensions (base and height) of the glass panes 2.

The industrial application and the advantages of the invention are important, since machines for automatic sealing are widespread. Known machines handle a single sealant or two sealants by resorting to replacements of the final feed path, with an abnormal expenditure of time. Introduction of an innovation whose scope has been described here provides instead two great possibilities: implementing the device invention on existing machines, provided that they have a sufficiently spacious hollow part of the extrusion head, and marketing directly automatic sealing machines of the versatile type, already provided according to the invention.

Moreover, the insulating glazing unit market is continuously evolving and expanding, since in recent years it has been increased by the need for higher thermal insulation at the spacer frame, hence the onset of the spacer profile made of expanded synthetic material 1', 1" which requires, for an equal plant for the production of the insulating glazing unit, the second sealing 1002 with hot HM or the second sealing 1002 with hot PIB and the third sealing 1003 with a cold sealant. This can be done in the same machine and therefore in the same line only with the machine and method of the present invention.

In addition, the spread of shapes which are non-rectangular because they are polygonal or curvilinear or mixed, enhances even further the importance of the present invention, since it can be applied also in automatic machines which seal insulating glazing units which have non-rectangular shapes, for example polygonal and curvilinear ones.

Application of the present invention in an insulating glazing unit production line is illustrated in FIGS. 10A and 10B (perspective view and plan view), clearly demonstrating the assured success in industrial application.

The disclosures in Italian Patent Application No. TV2006A000187 from which this application claims priority are incorporated herein by reference.

What is claimed is:

1. An automatic sealing machine for sealing a perimetric rim of an insulating glazing unit formed by at least two glass panes joined to each other by interposition of at least one spacer frame, the automatic sealing machine comprising:

a body structure;

a pseudovertical support system for supporting the insulating glazing unit;

a horizontal carriage for conveying the insulating glazing unit synchronously along a horizontal axis onto said pseudovertical support system, said carriage being provided with a sucker that is coupleable to an outer face of one of the glass panes of the insulating glazing unit;

a vertical carriage that is supported so as to be guidingly movable, along a substantially vertical axis, on said body structure;

a rotation assembly, supported at said body structure for rotation about a rotation axis;

an extrusion head assembly that is supported on said vertical carriage for vertical movement along said substantially vertical axis, said extrusion head assembly being further actuatable by said rotation assembly for rotary motion about said rotation axis;

at least two extrusion nozzles that are supported on said extrusion head assembly so as to each have an orientation that is switchable by way of said rotation assembly to selectively interface with a perimeter region of a vertical or of a horizontal side of the insulating glazing unit to be treated;

a volumetric dosage assembly, supported on said body structure, for dosing and transferring to said at least two extrusion nozzles hot and/or cold sealant in a required amount, established as a function of a cross-section of the insulating glazing unit to be filled and of the relative speed between the perimetric region to be treated and said at least two extrusion nozzles;

said horizontal and vertical carriages and said rotation assembly being selectively synchronously actuatable to provide relative horizontal, vertical and rotary motion of said insulating glazing unit and of said extrusion head assembly so that said at least two extrusion nozzles interface with the perimetric region of the insulating glazing unit to be treated and further perform finite or progressive rotations that are suitable to provide feeding selection among feeding paths for the hot and/or cold sealant that is fed to said at least two extrusion nozzles;

the automatic sealing machine further comprising:

switching valves provided along the sealant feed paths for selection of the product to be fed to the at least two extrusion nozzles;

a hollow part which is identified with a face of the extrusion head assembly that is provided with a plurality of feed ducts and a plurality of mixing units, acting as end parts of the feed paths for at least two sealants;

a counterweight, said plurality of feed ducts and said plurality of mixing units and said at least two extrusion nozzles being balanced statically by means of said counterweight; and heating elements for selectively heating said plurality of feed ducts.

2. The automatic sealing machine of claim 1, wherein selective feeding is provided among more than two sealant products.

3. The automatic sealing machine of claim 1, wherein said plurality of feed ducts and said plurality of mixing units are pivoted in a region of said extrusion head assembly which is located far from the insulating glazing unit arranged for treatment on said pseudovertical support system.

4. The automatic sealing machine of claim 3, wherein said region is located externally with respect to a gear of the rotation assembly of the extrusion head assembly on an opposite side with respect to an arrangement of the insulating glazing unit on said pseudovertical support system.

5. The automatic sealing machine of claim 1, comprising a sealant selection valve located proximate to said at least two extrusion nozzles.

6. The automatic sealing machine of claim 5, wherein said selection valve is manually or automatically actuatable.

7. The automatic sealing machine of claim 1, wherein said at least two extrusion nozzles each has a shape that is provided selected as a function of a distance between the two glass panes and of the distance between the spacer frame and wings of the glass panes.

8. The automatic sealing machine of claim 7, wherein said at least two extrusion nozzles are coupled to said extrusion head assembly like a slider for easy replaceability and convertibility.

* * * * *